United States Patent [19]

Besch

[11] 4,358,010
[45] Nov. 9, 1982

[54] CONVEYOR

[76] Inventor: Creighton J. Besch, 2330 - 43rd #405, Seattle, Wash. 98112

[21] Appl. No.: 292,171

[22] Filed: Aug. 12, 1981

Related U.S. Application Data

[63] Continuation of Ser. No. 116,797, Jan. 30, 1980, abandoned.

[51] Int. Cl.$^3$ ............... B65G 17/06; B65G 21/22
[52] U.S. Cl. ........................... 198/838; 198/841; 198/851; 198/955
[58] Field of Search ............. 198/442, 809, 817, 831, 198/838, 840, 841, 845, 851, 955; 113/116 HA

[56] References Cited

U.S. PATENT DOCUMENTS

1,939,862 12/1933 Preble ............................ 198/841
3,620,355 11/1971 Jones, Jr. et al. .................. 198/831
3,706,371 12/1972 Hirota ............................ 198/838

Primary Examiner—Jeffrey V. Nase
Attorney, Agent, or Firm—Christensen, O'Connor, Johnson & Kindness

[57] ABSTRACT

A conveyor for transporting articles placed in series thereon includes a conveyor track of extruded high density polyethylene having an upwardly opening inverted T-shaped longitudinal slot therein and an endless conveyor chain slidably engaged in the slot with integral chain tabs extending laterally outwardly into lateral slot recesses from selected links of the conveyor chain so as to retain the chain against lateral, vertical or torsional displacement with respect to the slot. The conveyor chain projects above the opening of the slot to support the conveyed articles and bears on an upstanding central rib on the slot bottom and, through its tabs, on the lateral recess bottoms. Convergent notches in corresponding ends of successively end-abutted track members making up the track guide the chain tabs into the slot recesses without interference from track member end faces due to slight misalignment of track members. A chain drive mechanism drives the chain in a continuous loop along the conveyor track and along a return path underneath the track.

9 Claims, 11 Drawing Figures

CONVEYOR

This is a continuation of the prior application Ser. No. 116,797, filed Jan. 30, 1980, now abandoned, the benefit of the filing dates of which are hereby claimed under 35 USC 120.

BACKGROUND OF THE INVENTION

The present invention relates generally to mechanical conveyors and, more particularly, to mechanical conveyors employing a roller chain as the primary weight-bearing element.

Various types of mechanical conveyors are known in industry for transporting articles from one part of an industrial plant or warehouse to another. Especially common are conveyors for transporting goods in cartons, boxes and the like. One common type is a conveyor belt assembly wherein an endless conveyor belt travels over a bed formed of rollers positioned transversely along the path of travel of the conveyor belt. The rollers bear the weight of the transported items and provide a low-friction bed over which the conveyor belt travels along its path of travel.

Such conveyor belt assemblies are known to have certain limitations and disadvantages. For example, they are generally limited to a straight path of travel. Multiple belts and their associated drive mechanisms are required to accommodate a curved path of travel. Also, the bearing assemblies of the numerous rollers are costly, noisy, subject to wear and require periodic maintenance. Finally, the belt tends to progressively stretch and deteriorate and requires periodic adjustment to maintain the correct tension.

In other applications a bed of rollers is employed without an overlying conveyor belt. Such a bed of rollers is suitable where articles such as rigid cartons or boxes are to be transported, but is generally unsuited to conveying small or irregularly shaped articles. The rollers of such a conveyor may be independently driven or freely journalled to the conveyor frame. In the case of freely journalled rollers, the conveyor assembly must be inclined or the articles must be otherwise propelled. Where the rollers are independently driven, each roller typically includes a chain sprocket at one end. An endless roller chain connects all of the roller sprockets to a drive motor. Such assemblies are dangerous because of the numerous sprocket/chain contacts. Such assemblies are also more subject to failure because of their greater mechanical complexity.

Certain mechanical conveyors known in the art employ one or more roller chains as the primary weight-bearing elements. A recognized problem with the use of roller chains as conveyor elements is that they are unstable and are subject to lateral, vertical and torsional displacement from their normal path of travel. Accordingly, various types of guides and sprockets are used to keep the roller chain element on course. The routine use of sprockets for this purpose is undesirable from a safety standpoint because they introduce relatively dangerous sprocket/chain pinch points. The various other types of chain guides known in industry are either inefficient for stabilizing the chain against lateral, vertical and torsional displacements or they introduce unacceptable amounts of friction along the path of travel of the conveyor chain.

Another disadvantage of using roller chains as weight-bearing elements in conveyors wherein the chain slides along a supporting surface is that the chain does not have a sufficiently large bearing surface area to prevent wear and abrasion. Consequently, both the chain and the surface on which it bears undergo relatively rapid deterioration with use. Also, it is difficult to adapt such a roller chain to accommodate a predetermined curved path of travel without also introducing unacceptable levels of friction in the conveyor assembly.

Accordingly, it is an object of the present invention to provide a mechanical conveyor wherein a conveyor element includes a weight-bearing roller chain that is constrained against lateral, vertical or torsional displacement from its normal path of travel.

It is also an object of the present invention to provide a conveyor that is economical to fabricate, has fewer moving parts and is easier to maintain and clean than a conventional conveyor belt or roller bed conveyor assembly.

It is a further object of the present invention to provide a mechanical conveyor that is safer than those heretofore available by reason of having fewer pinch points and fewer exposed sprocket/chain contacts.

It is still another object of the present invention to provide a mechanical conveyor employing a roller chain conveyor element that can accommodate a curved path of travel.

It is yet another object of the present invention to provide a conveyor that can accommodate a curved path of travel with a single drive mechanism.

It is still another object of the present invention to provide a roller chain for a conveyor that can accommodate a curved path of travel and which has an improved bearing surface for reducing wear due to abrasion.

SUMMARY OF THE INVENTION

In accordance with the present invention a mechanical conveyor assembly includes a conveyor track having an upwardly opening longitudinal slot. The slot includes outwardly extending recesses in its opposite sidewalls.

An endless conveyor chain includes integral tabs extending outwardly from selected links thereof. The conveyor chain is slidably engaged in the conveyor track with the tabs of the chain cooperably retained in and bearing upon the bottom surfaces of the outwardly extending recesses in the slot walls. The conveyor chain has a vertical cross-sectional dimension greater than the depth of the slot such that the chain partially extends above the opening of the slot. The chain thus forms a weight-bearing element for articles being conveyed thereon. The conveyor chain is retained by the tabs in the recesses against lateral, vertical or torsional displacement with respect to the slot. Thus, the chain is safely secured in the slot where it may be efficiently guided along the path of travel of the conveyor assembly. The tabs also operate to distribute weight loads on the chain over a greater surface area on the conveyor track and thereby reduce wear due to abrasion of both the chain and track.

The conveyor chain is configured in a closed loop and is driven along the conveyor track by a conventional chain drive mechanism. The chain thus travels continuously along the conveyor track and along a return path directly underneath the conveyor track.

In a preferred embodiment of the invention, the conveyor includes a return track directly underlying the conveyor track. The return track consists of a track essentially identical to the upper conveyor track, but inverted to accommodate the conveyor chain along its return path. Thus, along the return path the chain is supported in the downwardly opening slot of the return track by the tabs of the chain extending into and being supported by the recesses in the sidewalls of the slot.

In another preferred aspect of the invention, the upper conveyor track and the lower conveyor return track are formed of individual track members aligned in series. Each track member consists of an extruded length of ultrahigh molecular weight polyethylene plastic. In this embodiment, the conveyor chain preferably consists of a modified roller chain having integral tabs extending transversly from the inside edges of serially alternating pairs of sideplates. In this embodiment, the recesses in the sidewalls of the slot are continuous with the bottom surface of the slot.

The conveyor of the present invention is particularly safe, efficient and easy to maintain. There are no moving parts apart from the conveyor chain and its associated drive mechanism. The conveyor track and chain readily accommodate a curved path of travel where other conveyors would require multiple drive mechanisms and article bearing surfaces.

The use of polyethylene plastic to compose the track members results in a conveyor that is particularly quiet, durable and easy to clean. The polyethylene plastic is a self-lubricating material that can be readily adapted to accommodate a modified roller chain as described above to provide a conveyor element that is long-wearing under typical industrial conditions. The assembly may be simply washed down and may be easily adapted to avoid accumulation of debris in the slot of the conveyor track.

In another aspect of the invention, a pneumatic accumulator is mounted on the conveyor frame parallel to the conveyor track and chain assembly. The accumulator consists of upper and lower accumulator bars that are slidably engageable for relative vertical motion. A flexible pneumatic hose is enclosed between the accumulator bars. The upper accumulator bar may be raised by admitting low pressure air into the flexible pneumatic hose. The accumulator may thus be used to slightly lift articles off of the conveyor chain and thereby reduce the drag load on the conveyor chain at such times as a number of articles are temporarily accumulated on the conveyor.

These and other aspects and advantages of the invention are made more apparent by reference to the drawings and the following detailed description of a preferred embodiment.

DETAILED DESCRIPTION OF THE PREFERRED EMBODIMENT

Figure 1:
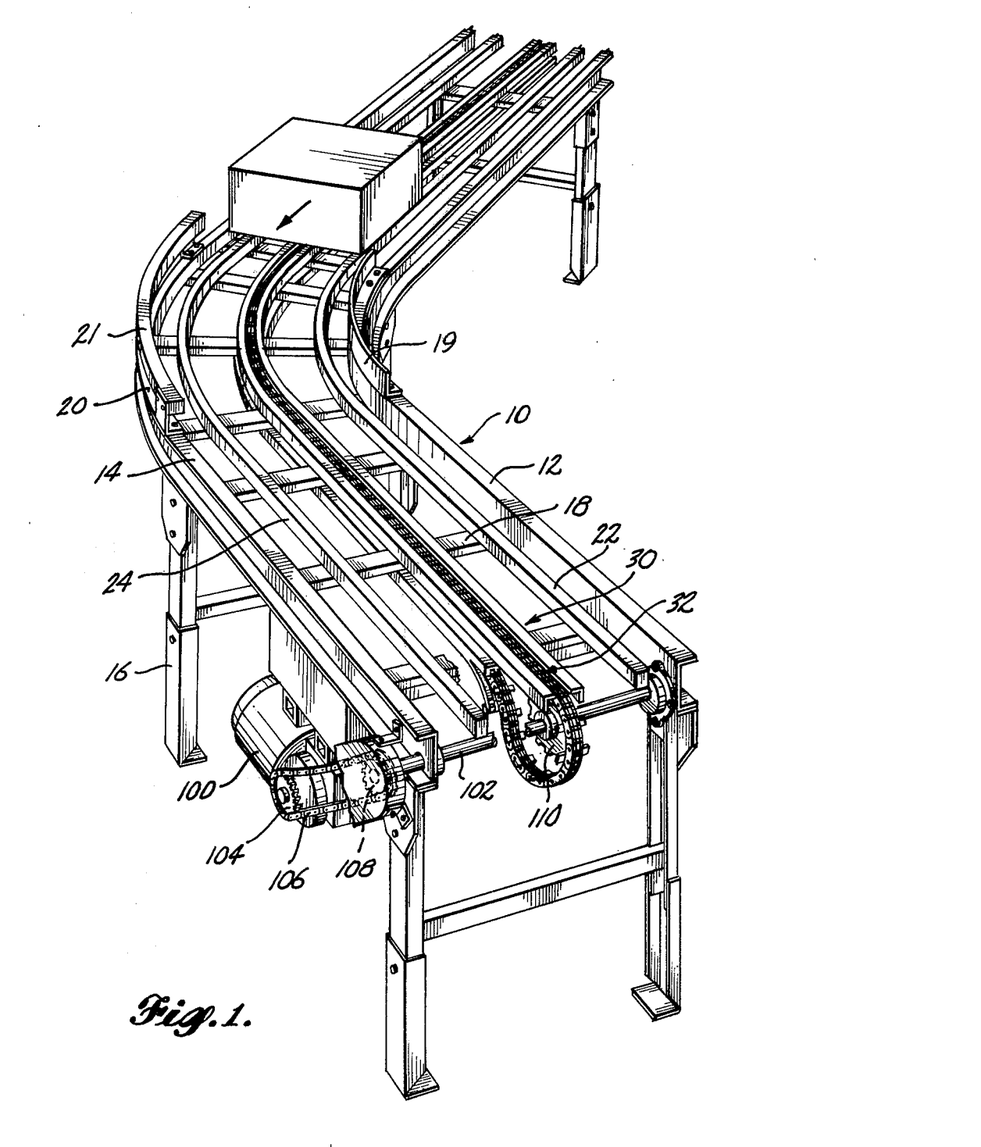
FIG. 1 is a pictorial view of a preferred embodiment of a conveyor constructed in accordance with the present invention.

Referring to FIG. 1, the preferred embodiment of the conveyor of the present invention incudes a conveyor frame 10 generally configured in accordance with the desired path of travel for articles carried on the conveyor. The frame 10 includes parallel steel channel siderails 12 and 14 positioned along the opposite sides of the path of travel. The siderails 12 and 14 are supported at a desired height by steel channel support legs 16. The frame 10 further includes a number of steel channel cross members 18 that extend transversely between and are secured to the siderails 12 and 14. Inner and outer guardrails 19 and 20 are mounted on the upper edges of the siderails 12 and 14, respectively, where the path of travel of the conveyor curves. The outer guardrail 20 includes a plastic runner 21 attached along its inside curved surface.

Mounted on the cross members 18 are a pair of runners 22 and 24 and a conveyor track 30. An endless conveyor chain 32 is slidably engaged in an upwardly opening longitudinal slot 34 centered along the upper surface of the track 30.

In operation, the conveyor chain 32 travels along the slot 34 of the conveyor track 30 and returns along a return path underneath the conveyor track 30. The cross-sectional vertical dimension of the chain 32 is somewhat greater than the depth of the slot 34 such that the chain 32 partially protrudes above the opening of the slot 34 to provide a weight-bearing element for articles being conveyed along the conveyor. The lateral runners 22 and 24 provide lateral support for articles being conveyed. Thus, articles placed on the conveyor bear upon the chain 32 and are carried thereby along the length of the conveyor.

Figure 7:
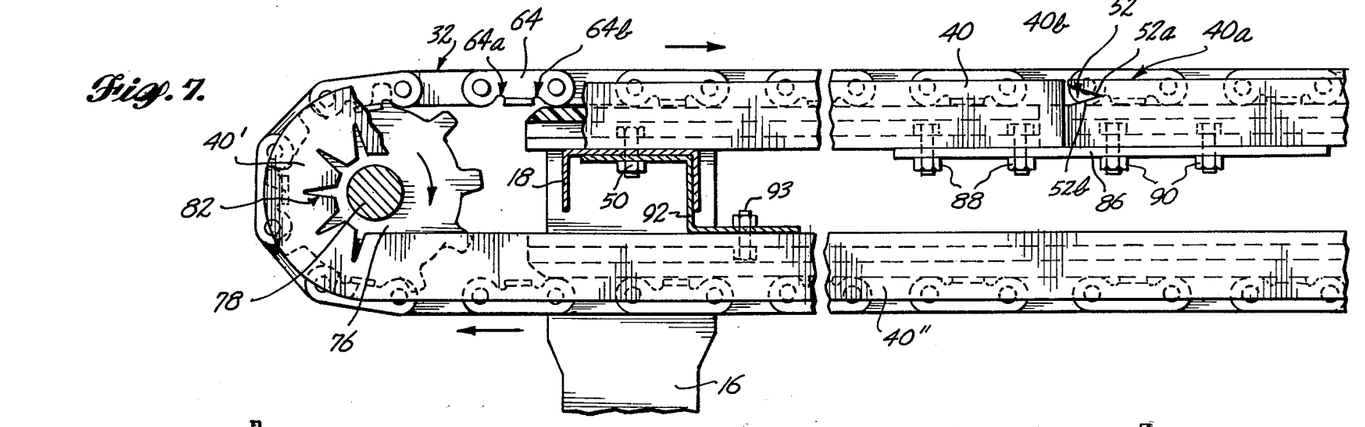
FIG. 7 is a cross-sectional side view of the unpowered end of the conveyor.

Referring to FIGS. 1 through 4, the conveyor track 30 mounted on top of the cross members 18 is formed of a number of individual conveyor track members 40 aligned in series and abutting one another. A single sprocket track member 40' is modified in a manner described below to wrap around the end of the conveyor, as shown in FIG. 7. The modified sprocket track member 40' connects the upper conveyor track members 40 with a chain return track 36 formed of a number of aligned return track members 40" attached to the undersides of the cross members 18. The return track members 40" are essentially identical to the upper conveyor track members 40 except that the return track members 40" are inverted to accommodate the chain 32 on its return path.

Figures 2, 3, 4:
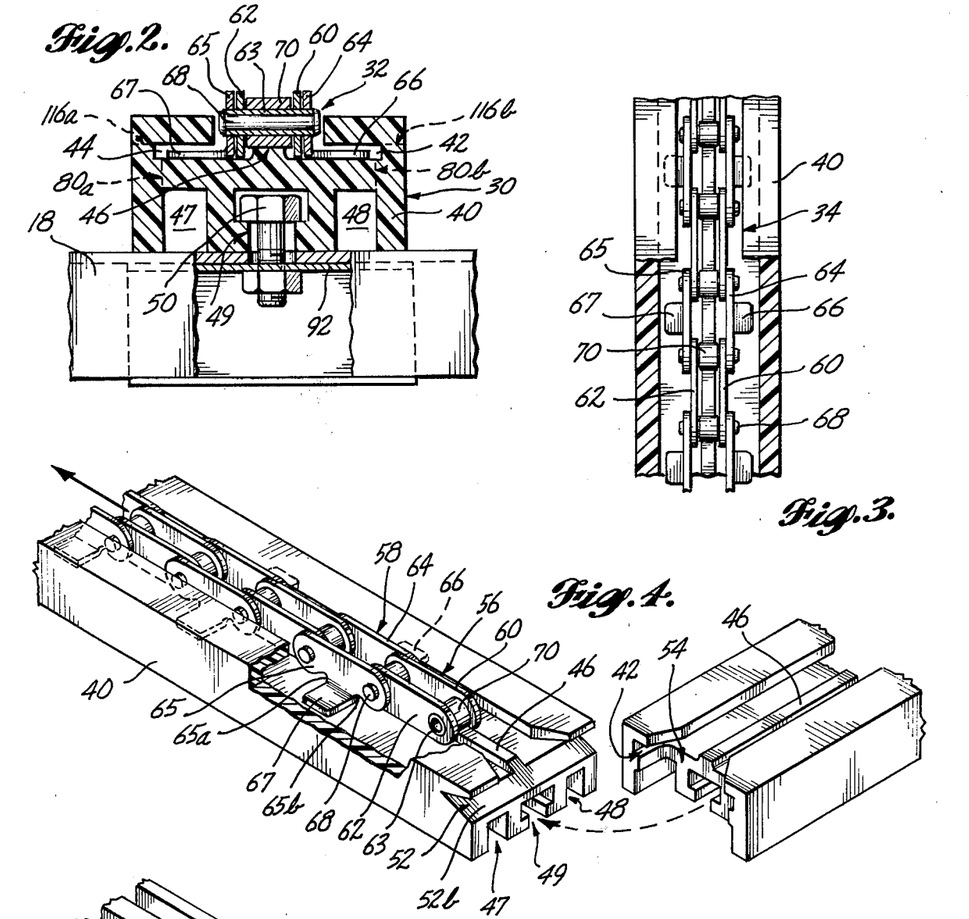
FIG. 2 is an end view in cross section of the conveyor chain and the conveyor track mounted on a cross member.
FIG. 3 is a top view in partial cross section of a portion of the conveyor chain and conveyor track.
FIG. 4 is an isometric view of portions of the conveyor chain and two adjacent conveyor track members, the track members being swung apart to show details of their ends.

Each track member 40 is generally rectangular in cross section and is formed of an extruded length of ultrahigh molecular weight polyethylene polymer. The central slot 34 runs along the upper surface of the track members 40 mounted on top of the cross members 18, and opens downwardly from the lower sides of the return inverted track members 40''. The central slot 34 in each track member 40 is generally of the shape of an inverted T and includes recesses 42 and 44 extending outwardly from the upright sidewalls of the slot 34. The outwardly extending recesses 42 and 44 open inwardly toward the center of the slot 34 and have bottom surfaces which are continuous with the bottom surface, or floor, of the slot 34. The slot 34 further includes a central longitudinal rib 46 that runs the length of each track member 40 and protrudes upwardly from the floor of the slot 34 along a centerline to form a bearing rail for the chain 34. The width of the slot 34 is sufficiently greater than the width of the chain 32 so as to enable the chain 32 to pass through a curve without binding, yet also guide the chain 32 along a predetermined path of travel without any substantial lateral instability.

Each track member 40 further includes two generally rectangular slots 47 and 48 running the length of the track member 40 and opening downwardly from the lower side of the track member 40. These slots 47 and 48 reduce the weight and cost of each track member 40 with no sacrifice in strength or efficiency. Each track member 40 further includes a central T-shaped slot 49 opening downwardly and centered between the slots 47 and 48. The T-shaped slot 49 is configured to cooperably receive the head and shank of a bolt 50 employed to attach the track member 40 to a cross member 18.

Referring to FIGS. 4 and 7, each track member 40 has a receiving end 40a adapted for chain entry and a discharge end 40b adapted for chain exit. At the receiving end 40a of each track member 40, a transverse V-shaped notch 52 converges toward and opens into the outwardly extending recesses 42 and 44. The V-shaped notch 52 has top and bottom faces 52a and 52b that operate to guide the chain 32 as it travels from the discharge end 40b of one track member 40 to the receiving end 40a of an abutting adjacent track member 40, thereby preventing the chain 32 from catching or hanging as it is drawn into the slot 34. At the discharge end 40b of each track member 40, a clean-out notch 54 is provided in the interior portion of the slot 34 whereby debris accumulated in the slot 34 is removed by action of the conveyor chain 32 continuously moving over the notch 54.

The conveyor chain 32 is a modified roller chain formed of two types of serially alternating articulated chain links 56 and 58 linked together in a closed loop. The chain links 56 of the first type are formed of pairs of inner sideplates 60 and 62, respectively, each sideplate 60 and 62 having two holes at its opposite ends. Each pair of inner sideplates 60 and 62 forming a chain link 56 is connected by a pair of cylindrical sleeves 63 pressed at their opposite ends into the cooperably facing holes in the ends of the inner sideplates 60 and 62. Two cylindrical sleeves 63 and two inner sideplates 60 and 62 thus form an individual chain link 56 of the first type.

The serially alternating chain links 58 of the second type each include a pair of outer sideplates 64 and 65. The outer sideplates 64 and 65 each include an integral, outwardly extending tab 66 and 67, respectively, extending orthogonally from one edge thereof. More specifically, the tabs 66 and 67 protrude from the inner edges of the outer sideplates 64 and 65, that is, the edges positioned along the inside of the circumference of the closed loop of the chain 32. The tabs 66 and 67 are formed by integral extensions of the sideplates 64 and 65 that are bent outwardly at a right angle to the sideplates 64 and 65. The inner edges of the outer sideplates 64 and 65 include small indentations 64a and 64b and 65a and 65b adjacent the tabs 66 and 67, respectively, which allow the tabs 66 and 67 to be bent outwardly such that their bottom surfaces are coplanar with the inner edges of the inner sideplates 60 and 62 as well as the rounded, inner edges at the opposite ends of each outer sideplate 64 and 65. With this configuration, the exposed inner edges of both the inner and outer sideplates 60 and 62 and 64 and 65, as well as the bottom surfaces of the tabs 66 and 67, all bear upon the bottom surfaces of the slot 34 and the recesses 42 and 44 to thereby provide the chain with a maximum bearing surface area to minimize wear and deterioration of the conveyor track members 40.

Each outer sideplate 64 and 65 further includes a hole at each end thereof. Transverse pivot pins 68 connect each pair of outer sideplates 64 and 65 to the next adjacent chain links 56 of the first type. Each pin 68 passes through the holes in the ends of a pair of outer sideplates 64 and 65 and through the sleeve 63 connecting the serially adjacent pair of inner sideplates 60 and 62 of an adjacent chain link 56. The pins 68 have a diameter slightly less than the inside diameter of the sleeves 63 in order to provide the chain 32 with sufficient lateral flexibility to pass along curved portions of the conveyor track 30. Each pin 68 is peened at each end to permanently retain the outer sideplates 64 and 65 pivotably engaged against the outside surfaces of the inner sideplates 60 and 62. The chain 32 further includes cylindrical rollers 70 freely engaged for rotational movement about the sleeves 63 between each pair of inner sideplates 60 and 62.

In normal operation, the conveyor chain 32 is driven to slide along the slot 34 of the track 30. The tabs 66 and 67 of the conveyor chain 32 extend outwardly into and are retained in the recesses 42 and 44, respectively. In this manner the chain 32 is retained against vertical, lateral or torsional movement, yet is nevertheless free to slide axially along the slot 34, even through curved portions of the track 30. The chain 32 cannot be lifted out of the slot 34, nor can it be tipped sideways or twisted longitudinally under the effects of articles being transported thereon.

The central rib 46 of the slot 34 is of a height such that it is in contact with the rollers 70 when the bottom surfaces of the tabs 66 and 67 bear upon the bottom surfaces of the outwardly extending recesses 40 and 42 and the inner edges of the chain links 56 and 58 bear upon the bottom of the slot 34. In this manner, weight loads on the chain 32 are distributed to both the rib 46 and the bottom surfaces of the outwardly extending recesses 42 and 44 and the slot 34 by means of the rollers 70, the tabs 66 and 67 and the inner edges of the sideplates 60 and 62 and 64 and 65. Distributing the load in this manner over a greater bearing surface area of the chain 32 reduces wear of both the track members 40 and the chain 32 and lengthens the service life of the entire assembly. The polyethylene forming the track members 40 has a self-lubricating characteristic that results in exceptional durability over long periods of use, even in the absence of routine lubrication or other maintenance.

Referring to FIG. 7, the conveyor chain 32 passes around an idler sprocket 76 at the unpowered end of the conveyor assembly. The idler sprocket 76 turns on a shaft 78 journalled to the opposite siderails 12 and 14 at the end of the conveyor assembly. The modified sprocket track member 40' at the unpowered end of the conveyor assembly is adapted to pass around the sprocket 76 so as to completely enclose the pinch, or contact points between the sprocket 76 and the chain 32. To accomplish this result, a track member 40 as described above is cut along a portion of its length along the dotted lines designated 80a and 80b in FIG. 2. This is done along a midsection of the track member 40 sufficiently long to pass completely around the sprocket 76 and chain 32 at the end of the conveyor assembly. V-shaped notches 82, shown in FIG. 7, are cut in the sidewalls of the modified track member 40' to enable bending of the track member 40' around the sprocket 76.

Abutting ends of the various track members 40 are aligned and reinforced with a steel plate 86, illustrated in FIG. 7, bolted at its opposite ends by pairs of bolts 88 and 90 to the adjacent ends of the abutting track members 40.

As mentioned earlier, each track member includes a central T-shaped slot 49 configured to accept the head and shank of a bolt 50 attaching the track member 40 to a cross member 18. Referring again to FIG. 7, the steel channel cross members 18 open downwardly and include centered holes sized to accept the bolts 50. An Z-shaped steel plate 92 is bolted to the underside of each steel channel cross member 18 by the bolt 50 used to mount the upper track member 40 to the upper side of the cross member 18. The Z-shaped steel plate 92 is thus attached at one end to the interior web of the steel channel cross member 18 by the bolt 50 attaching the upper track member 40 to the cross member 18. The opposite end of the Z-shaped plate 92 extends laterally away from one lower edge of the cross member 18 and provides a rigid support member to which a return track member 40" on the underside of the cross member 18 may be attached. The return track member 40" is attached to the extending portion of the Z-shaped plate 92 by a nut and bolt assembly 93 in the same manner that the upper track member 40 is attached to the upper surface of the cross member 18.

Figure 5:
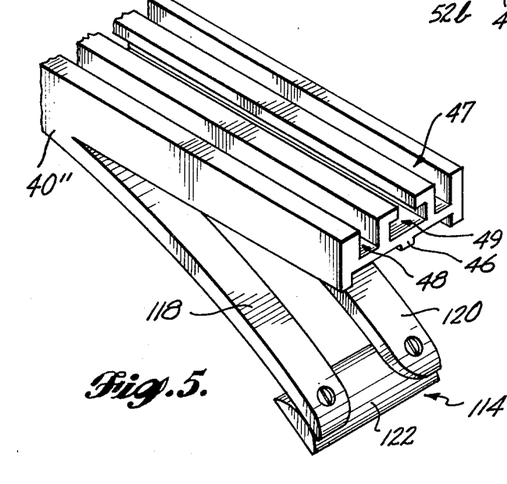
FIG. 5 is an isometric view of one end of a return track member, inverted as it would be attached to the underside of the conveyor frame and modified to include a flexible chain guide for guiding the conveyor chain into the slot of the return track member.
Figure 6:
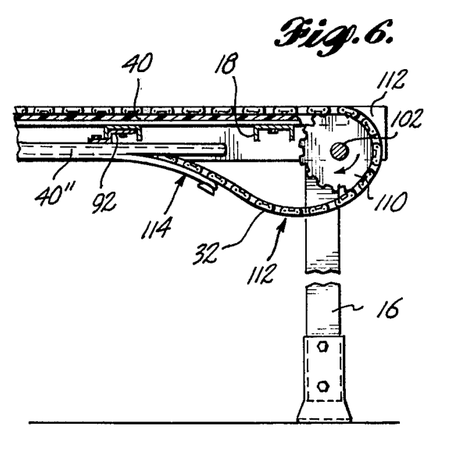
FIG. 6 is a cross-sectional side view of the powered end of the conveyor.

Referring to FIG. 1, the conveyor chain 32 is driven by a ¾ H.P. electric motor 100 mounted on the side of the conveyor frame 10. The motor 100 drives a sprocket shaft 102 by means of a sprocket 104 on the output shaft of the motor gearbox, a conventional roller chain 106 and a sprocket 108 on the end of the sprocket shaft 102. The shaft 102 is journalled to the opposite siderails 12 and 14 and has a fixed sprocket 110 centered therebetween. In operation, the conveyor chain 32 is continuously drawn over the powered sprocket 110 and passes therefrom through a catenary sag 112 where slack in the chain 32 is accumulated. From the catenary sag 112 the conveyor chain 32 is guided into the slot 34 of the return track members 40" by a downwardly depending flexible chain return guide 114 shown in FIG. 5. The flexible guide 114 is formed by cutting a portion of the chain entry end of the first return track member 40" along the dotted lines 116a and 116b shown in FIG. 2. This results in two parallel strips of flexible plastic 118 and 120. The ends of these strips 118 and 120 are connected by a short plastic cross member 122. The strips 118 and 120 and the cross member 116 bend downwardly under the weight of the chain 32 and engage the tabs 66 and 67 of the chain 32 to provide a flexible return guide 114 that operates to guide the conveyor chain 32 smoothly into the slot 34 of the first return track member 40".

Figure 8:
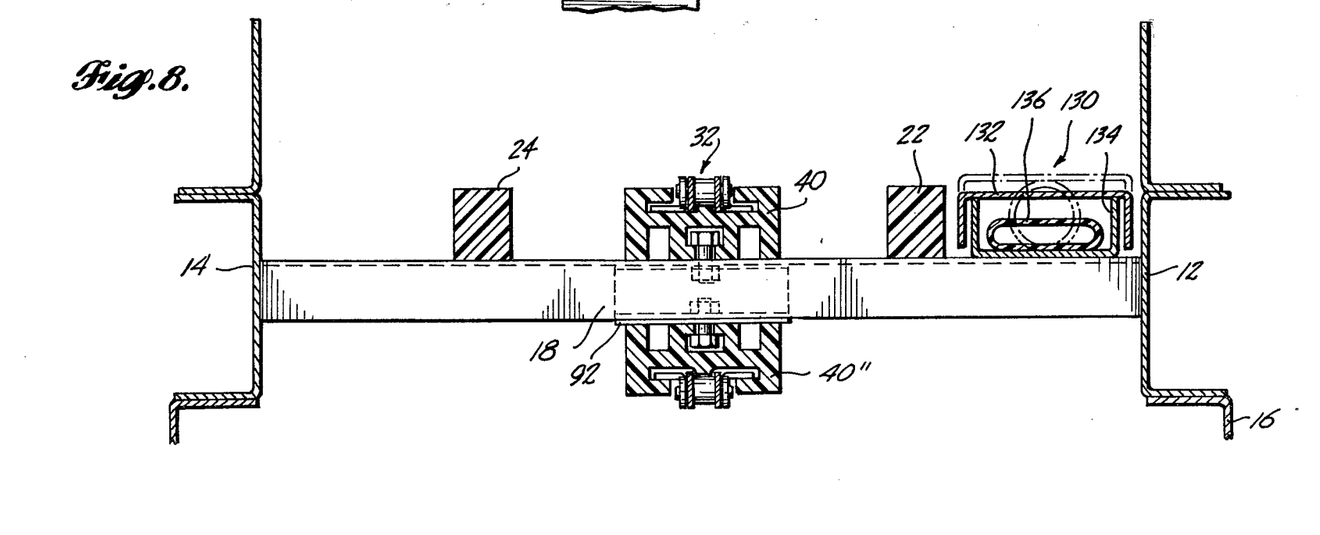
FIG. 8 is a cross-sectional end view of an alternative embodiment of the conveyor including two accumulators mounted on the cross member.

In an alternative embodiment illustrated in FIG. 8, the conveyor assembly further includes an accumulator 130 mounted on the cross members 18 between the siderail 12 and the runner 22. The accumulator consists of upper and lower accumulator bars 132 and 134, respectively, and a flexible pneumatic hose 136 enclosed therebetween. The upper accumulator bar 132 is of the form of a downwardly opening steel channel. The lower accumulator bar 134 is of the form of an upwardly opening steel channel having a smaller width than that of the upper accumulator bar 132 such that the upper accumulator bar 132 fits over and encloses the lower accumulator bar 134.

The flexible hose 136 is connected to a source of low pressure air (not shown). The flexible hose 136 may be selectively pressurized to cause it to expand and raise the upper accumulator bar 132, as shown in phantom outline in FIG. 8. Raising of the upper accumulator bar 132 causes articles on the conveyor assembly overlying the accumulator 130 to be tilted upwardly off of the conveyor chain 32. In this manner, a number of articles can be allowed to accumulate on the conveyor assembly without imposing a severe drag load on the conveyor chain 32. Such is the case, for example, where articles are manually removed at the end of a conveyor assembly when the workload becomes high and a temporary accumulation of articles occurs. In such a situation, an employee or operator will actuate the accumulators to temporarily lift accumulated articles off the conveyor chain 32 until such time as they can be removed from the conveyor assembly.

Figure 9:
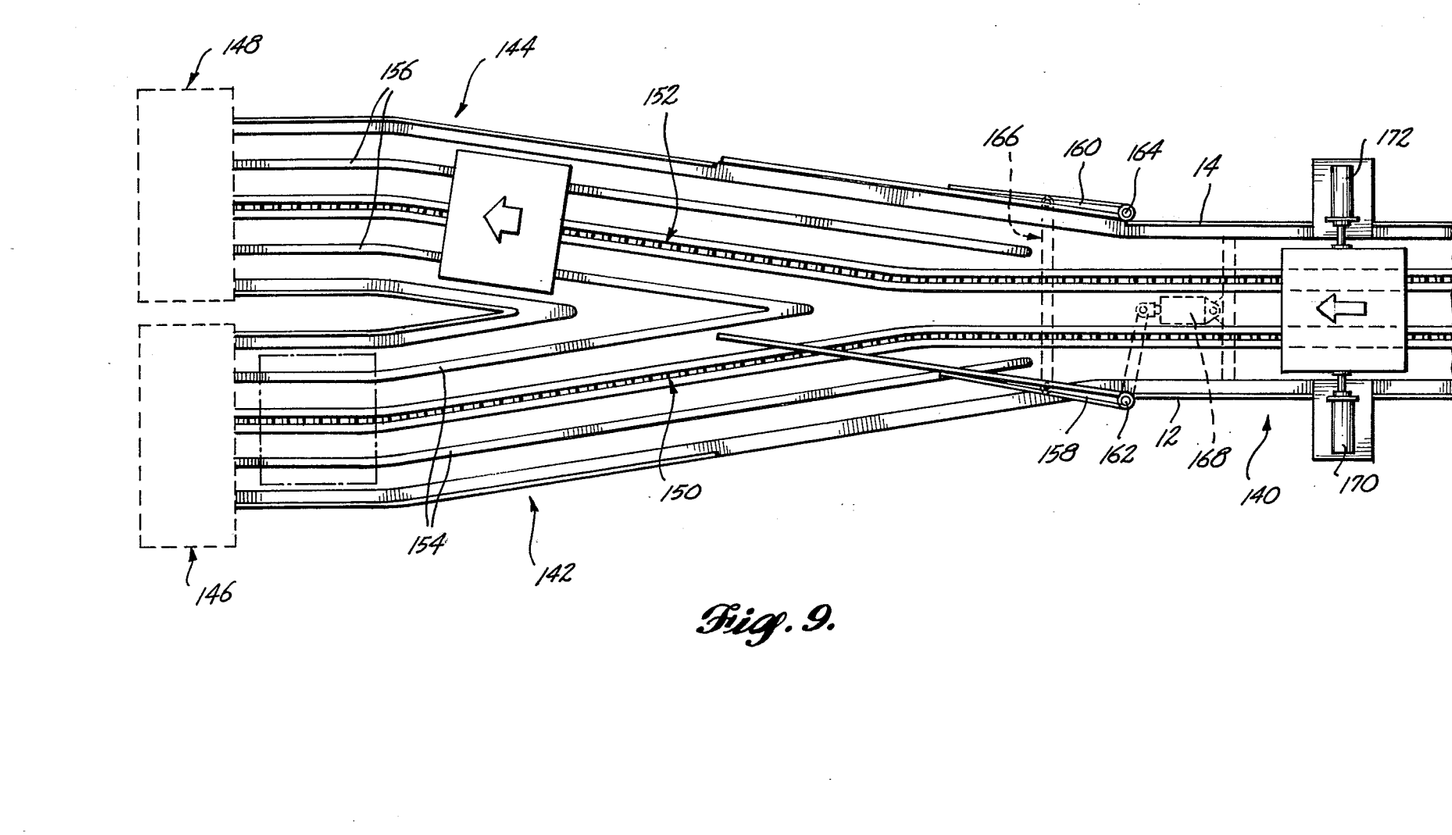
FIG. 9 is a plan view of a conveyor constructed in accordance with the present invention and having diverging conveyor paths.

The cooperable chain and conveyor track assembly of the present invention is particularly useful in the fabrication of conveyors having diverging or converging paths of travel. For example, FIG. 9 illustrates an embodiment of the invention wherein a conveyor assembly includes a first path of travel 140 that diverges into two separate paths of travel 142 and 144. Such a configuration is desirable where a particular processing operation, for example, automatic packaging of articles, is relatively time-consuming and would create a bottleneck in the overall process if only a single automatic packaging machine could be employed on a processing conveyor line. To meet such a situation, two automatic packaging machines 146 and 148 (represented in phantom outline) may be employed in tandem along the separate paths of travel 142 and 144.

In the conveyor assembly illustrated in FIG. 9 another aspect of the invention is depicted wherein articles being conveyed in a first path can be directed selectively into either of the two illustrated paths, as well as into other, alternative paths if desired. It includes two independently driven conveyor chains 150 and 152 and their associated conveyor tracks. Along the first path of travel 140 of the conveyor assembly the conveyor chains 150 and 152 operate together. At the point of divergence or branching of the first path of travel 140 into the two separate paths of travel 142 and 144, the conveyor chains 150 and 152 diverge from one another to operate independently along the separate portions of the conveyor. Pairs of polyethylene runners 154 and 156 are provided along each side of the conveyor chains 150 and 152 along the separate paths of travel 142 and 144, respectively. With a single pair of diverging conveyor chains 150 and 152 employed as illustrated, the advantage of the conveyor assembly lies in the fact that a total of only two drive mechanisms is required to operate the entire conveyor assembly, whereas in prior art conveyors multiple drive assemblies have been employed to accomplish the same result.

The conveyor illustrated in FIG. 9 further includes a pair of swingable diverter arms 158 and 160 that operate to selectively guide articles from the first path of travel 140 onto either one of the separated paths of travel 142 or 144. The two diverter arms 158 and 160 swing in tandem about pivot shafts 162 and 164 mounted on the side rails 12 and 14 of the conveyor. The diverter arms 158 and 160 are linked together by a cross member 166 to operate in tandem and are driven by a common actuator 168 underneath the bed of the conveyor. A pair of conveyor stop assemblies 170 and 172 selectively operate to momentarily stop articles on the conveyor when the diverter arms 158 and 160 are being switched.

If further desired, either of the separate paths of travel 142 and 144 may be further branched and/or may be caused to converge into another single path of travel at a point downstream on the conveyor assembly from the packaging machines 146 and 148. Convergence of the two paths of travel 142 and 144 into a subsequent single path of travel is readily accomplished using the same manner of construction as that illustrated in FIG. 9, but without the diverter arms 158 and 160 or the stop assemblies 170 and 172. The conveyor chains 150 and 152 are simply merged together in a single conveyor path to operate in tandem, as in the first path of travel 140 of FIG. 9.

Figure 10:
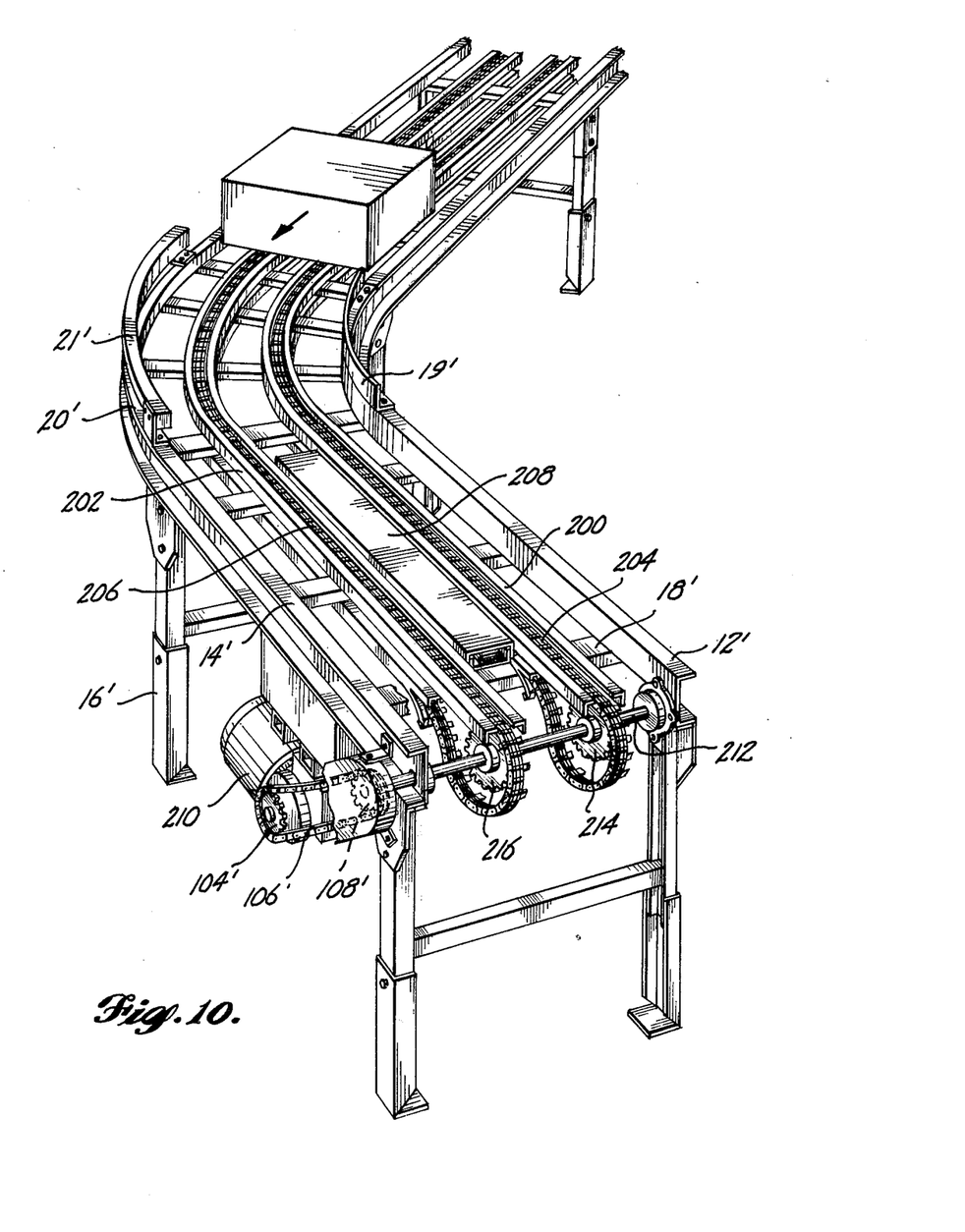
FIG. 10 is a pictorial view in cross section of an alternative preferred embodiment of the present invention.
Figure 11:
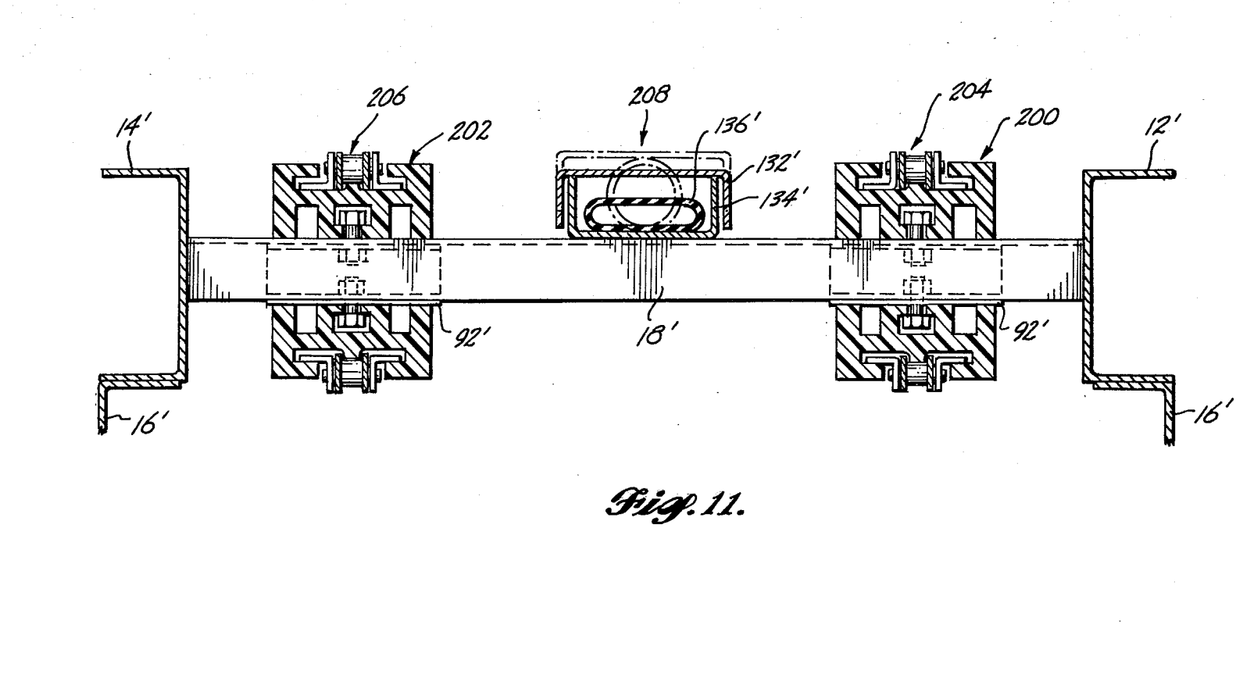
FIG. 11 is an end view in cross section of the conveyor illustrated in FIG. 10.

FIGS. 10 and 11 illustrate another embodiment of the present invention wherein two parallel conveyor tracks 200 and 202 and their associated conveyor chains 204 and 206 are employed in a conveyor. An article accumulator 208 is positioned between the tracks 200 and 202 at the downstream end of the conveyor. The parallel conveyor chains 204 and 206 are driven by a single drive motor 210 that operates to turn a common sprocket shaft 212 and two drive sprockets 214 and 216 affixed thereto. Other features of this embodiment are essentially the same as those of the conveyor illustrated in FIG. 1 and are indicated by primed reference numerals which correspond to the reference numerals of FIGS. 1 through 8.

The advantages of the dual chain conveyor of FIGS. 10 and 11 include greater durability and greater stability for articles being transported on the conveyor. The necessity for the polyethylene runners 22 and 24 of the conveyor of FIG. 1 is eliminated. The accumulator 208 centered between the conveyor chains 204 and 206 lifts articles directly upward and off of the chains 204 and 206 to efficiently hold articles stationary while not imposing any drag load on the chains 204 and 206. Finally, as noted above, the dual chain conveyor is readily adaptable to accommodate diverging and converging paths of travel.

Although the present invention is illustrated and described by reference to a preferred embodiment and certain alternative embodiments, it is understood that various alterations, modifications and substitutions that may be apparent to one skilled in the art may be made without departing from the spirit of the invention. Accordingly, the scope of the invention is defined by the following claims.

The embodiments of the invention in which an exclusive property or privilege is claimed are defined as follows:

1. An endless article conveyor for transporting articles placed thereon comprising:
    an elongated conveyor track having an upwardly opening longitudinal guide slot therein, said guide slot having upright longitudinal sidewalls with mutually opposed, transversely extending longitudinal side slots recessed therein, said guide slot having a bottom with a longitudinal running rail upstanding from said bottom and centered between said sidewalls and having a width dimension narrower than the spacing between said sidewalls;
    an endless article support conveyor chain engaged and longitudinally movable in said guide slot, said chain comprising a series of links successively interconnected, links at regular intervals in said series having opposed substantially flat stabilizer tabs extending transversely into and slidably engaged in the respective side slots, links at regular intervals in said series having transversely spaced upright sideplates downwardly overlapping respectively opposite sides of said rail, links at regular intervals in said series carrying and being supported by transversely extending chain rollers disposed in longitudinal rolling engagement with the top of said rail, said chain projecting upwardly above the track to engage load articles for moving the same along said track, wherein the track comprises a unitary elongated extrusion of polymeric synthetic material having top and opposite side faces, said guide slot comprising an inverted T-shaped slot formed opening upwardly on said top face with an integral rib upstanding from the bottom of the guide slot to form said rail.

2. The combination defined in claim 1, wherein the links having transversely spaced upright sideplates have transversely extending chain rollers mounted at opposite ends thereof disposed in rolling engagement with said rail.

3. The combination defined in claim 2 wherein the links having opposed transversely extending tabs comprises upright, substantially flat, transversely spaced, longitudinally extending, parallel sideplates having opposite ends straddling and pivotally connected to the links having transversely extending chain rollers.

4. The combination defined in claim 3 wherein said sideplates of said links having transversely extending chain rollers comprise transversely spaced, substantially flat, longitudinally extending, parallel plates connected by transversely extending sleeves on which said chain rollers are rotatably mounted.

5. The combination defined in claim 3 wherein said stabilizer tabs extend transversely outwardly from the lower edges of said upright parallel sideplates having opposite ends straddling the links having transversely extending chain rollers.

6. The combination defined in claim 1 wherein said track is formed of high-density polyethylene.

7. The combination defined in claim 6 or 1 wherein said conveyor track comprises a plurality of end-abutting track members aligned in series, each track member having first and second end faces, said first end face facing against the direction of conveyor movement and including a transverse V-shaped notch having top and bottom faces converging inwardly longitudinally of the track member toward said side slots so as to guide the stabilizer tabs of the chain in moving from the side slots of the preceding track member into the side slots of the next succeeding track member.

8. The combination defined in claim 1 wherein each link of said chain comprises a pair of elongated spaced-apart upright sideplates that straddle the rail of the conveyor track, and wherein said sideplates include lower edges that extend in a common plane, and wherein said stabilizer tabs have lower surfaces that are substantially coplanar with said lower edges of said sideplates.

9. The combination defined in claim 8 wherein said track is formed of high-density polyethylene.

* * * * *